Jan. 17, 1956   W. S. JAMES   2,731,102
APPARATUS FOR REMOVING HEAVY DUST FROM AIR
Filed May 9, 1952   2 Sheets-Sheet 1
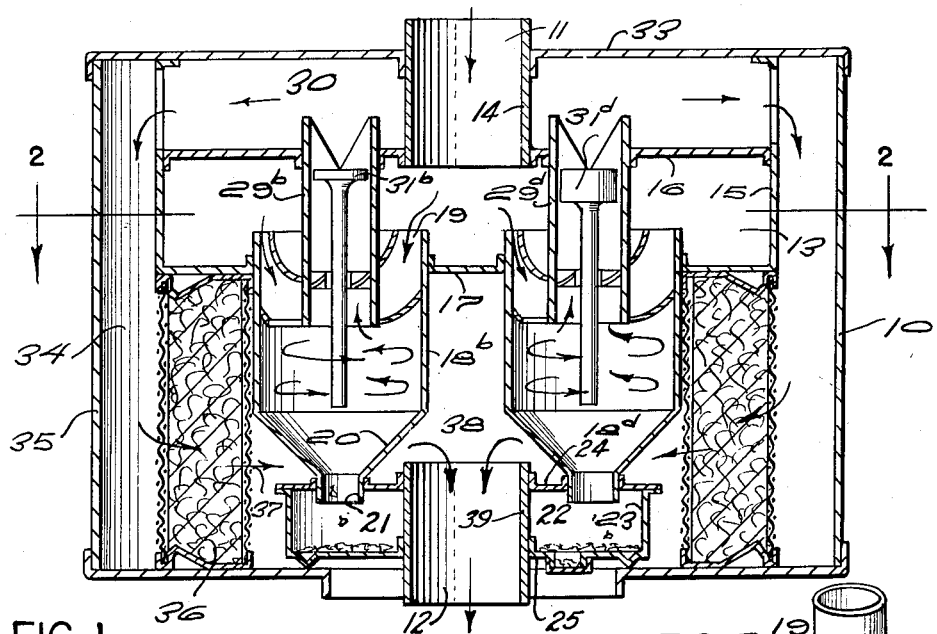
FIG. 1
FIG. 3
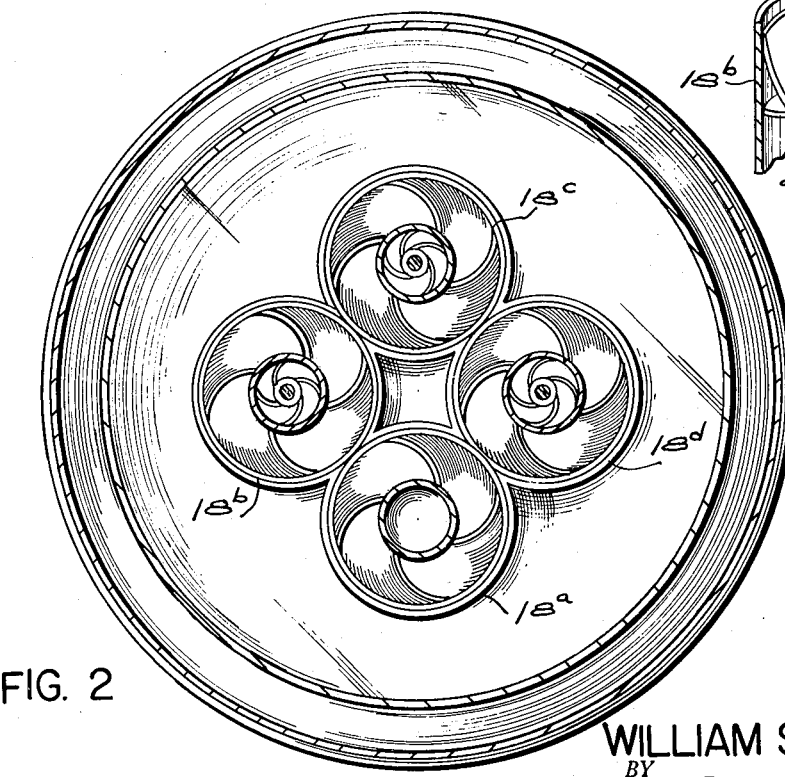
FIG. 2
INVENTOR.
WILLIAM S. JAMES
BY
Barlow & Barlow
ATTORNEYS Jan. 17, 1956     W. S. JAMES     2,731,102
APPARATUS FOR REMOVING HEAVY DUST FROM AIR
Filed May 9, 1952     2 Sheets-Sheet 2

INVENTOR.
WILLIAM S. JAMES
BY
Barlow & Barlow
ATTORNEYS

United States Patent Office 2,731,102
Patented Jan. 17, 1956

2,731,102

APPARATUS FOR REMOVING HEAVY DUST FROM AIR

William S. James, Providence, R. I., assignor to Fram Corporation, a corporation of Rhode Island Application May 9, 1952, Serial No. 286,963

1 Claim. (Cl. 183—34)

This invention relates to the separation of solid particles from gases, such as dust from air.

Separators or filters of this general nature are usually variously efficient in the order of removing from 95 to 99 or sometimes slightly better percentage of dust which passes through them. Where large volumes of dust are present in the air, filters of a higher order which remove 99 or 99.5 percent of the dust are limited in their capacity by reason of the size of the units which are supplied, particularly this is true in the automotive industry where sizes of the filters are limited. Larger capacities are sometimes present in tractors, where there is a greater amount of dust to be handled. In a filter such as that shown in application Ser. No. 178,639, now abandoned, where a tricresyl phosphate is used for treating a flock-like material, the percentage of removal of dust from air is in the order of 99–99.5 percent. The capacity of such filter is about 100 grams of dust and accordingly when used on tractors or where there is a relatively large volume of dust, the cartridges are short-lived and must be removed and replaced frequently.

One of the objects of this invention is to provide a greater capacity of a cartridge of this efficiency by removing a large part of the dust prior to its contacting the tricresyl treated flocked material.

Another object of this invention is to utilize a centrifugal type of device for this removal.

In the use of a centrifugal type of device, size is of importance in that the linear flow of air about the circular wall of a centrifugal device governs the velocity of the flow. That is, where a wall is of large diameter, the flow will be correspondingly small as a much greater linear surface of this wall is provided. Consequently, with large capacities of a single large unit less efficiency in the centrifugal action is provided, especially where the flow is small.

A further object of this invention is to provide a construction in which the diameter of each centrifugal acting chamber is small, thus maintaining a high velocity rate of the air passing through it.

Another object of the invention is to provide for a large range of air flow, it being known that much more air is required at high speeds of an engine as more air is taken in than at low speeds.

Accordingly, an object of this invention is to provide a plurality of centrifugal acting devices with an arrangement so that as the flow increases, one after the other of these will cut in to become effective while as the flow decreases, one after the other of these will cut out so that the velocity through the chambers is maintained as a desired function of the pressure.

Another object of the invention is to provide some collecting means for withdrawing the dirt from the chambers in which it is collected, as the filtering progresses.

With these and other objects in view, the invention consists of certain novel features of construction, as will be more fully described and particularly pointed out in the appended claim.

In the accompanying drawings:

Fig. 1 is a sectional view illustrating the apparatus which is the subject of this invention;

Fig. 2 is a sectional view on line 2—2 of Fig. 1;

Fig. 3 is a fragmental perspective view illustrating the vanes for guiding the air as it enters the different centrifugal chambers;

Figure 4:
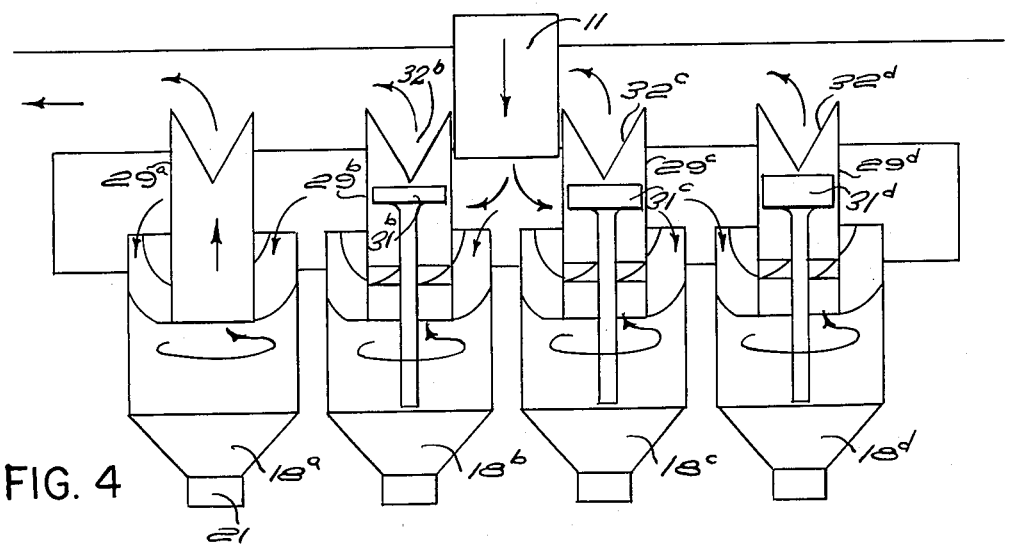
Fig. 4 is a diagrammatic view illustrating the plurality of chambers for successive operation.

In proceeding with this invention, I have utilized a high efficiency air filter and placed ahead of this filter in the flow line of the air or gas which it is to clean, a centrifugal type device for separating dust particles from the air. This centrifugal apparatus comprises a plurality of relatively small chambers so that as air passes through them in a whirling fashion, their linear velocity will be high by reason of the small diameter of the chamber and in order that the capacity of the device may be over a wide range, I have arranged for different chambers to cut in or cut out in accordance with the predetermined differential of pressure at the common inlet and common outlet to all of the chambers, thus maintaining the velocity of the air in each chamber at a high speed so that the centrifugal force of this circular motion may throw the particles of dirt from the air against the walls of the chamber and permit them to slide down the side walls of the chamber and separate from the air.

With reference to the drawings, 10 designates a casing having an inlet port 11 and an outlet port 12. Within this casing, I provide a compartment 13 into which the tube 14 forming the inlet port 11 extends so that the inlet gas is directed into this compartment 13. This compartment 13 is formed by a cylindrical wall 15 and a top wall 16 with a bottom wall 17. Set into this bottom wall 17 there are a plurality of chambers 18, I having shown four of these chambers, 18a, 18b, 18c and 18d (Fig. 2). These chambers are four in number and are located substantially 90° apart or quarterly with respect to the center axis of the casing. A different number may be used.

Each chamber comprises a cylindrical wall which is open at its top at 19 into the compartment 13 while it is tapered as at 20 at its lower portion with a discharge nozzle 21 extending from its lower end. The discharge nozzles all enter a dirt receiving enclosure 22 which is formed by a cylindrical wall 23 and top wall 24 and bottom wall 25. Access is provided to this enclosure for the removal of dirt therefrom. Curved vanes 26, 27 and 28, as shown in perspective in Fig. 3 are provided at the upper end of each of the chambers 18, which vanes surround a cylindrical discharge conduit 29 for the removal of air which enters the chamber 18. As the air enters the chambers from the compartment 13, it is given a circular or whirling motion by reason of the vanes and will swirl about the inner surface of each of the chambers 18a, 18b, 18c and 18d to throw, from the air or gas thus whirling, any particles against the side walls of the chamber 18, permitting them to slide down the side walls and into the chamber 22. The air or gas after whirling in this fashion leaves the chamber in an upward direction through the conduit 29 supported centrally of the chamber. This conduit extends from a point inwardly of the top edge of the chamber through the compartment 13 into the area 30 of the casing.

The chamber 18a has its discharge conduit 29a always open but in each of the other conduits 29b, 29c and 29d, there is a valve 31b, 31c and 31d. These valves are each of a different weight so that as the differential of pressure between the inlet and outlet ports 11 and 12 increases, one after the other of these valves each being of a different weight will rise to uncover the graduated or V-shaped opening 32b, 32c and 32d, so as to permit additional chambers to be opened for the passage of air therethrough in the same swirling fashion as described for the open chamber 18a. The relative weights of these valves are shown in the diagrammatic view in Fig. 4. Each of these chambers discharge into the area 30 which is between the top wall 16 of the compartment and the top wall 33 of the casing. Air after it has been passed through these centrifugal devices and into the area 30 will then pass downwardly into the annular area 34 between the side wall 35 of the casing and the cylindrical wall 15 of the compartment to below the compartment and then into the annular ring 36 of filter material which will remove the fine particles of dust from the air. The air after passing through this filter as shown by arrow 37 will enter the area 38 within the filter 36 and pass out of the casing through the conduit 39 which is a tube extending through the dust closure 22. This filter 36 is a fibrous material which is treated with tricresyl phosphate and which may take various forms for removal of dust in air up to 99.5%.

Figure 5:
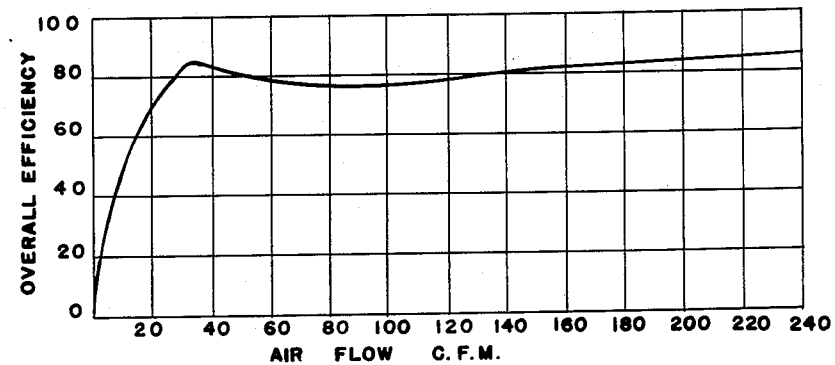
Fig. 5 is a chart showing the efficiency of the filter.
Figure 6:
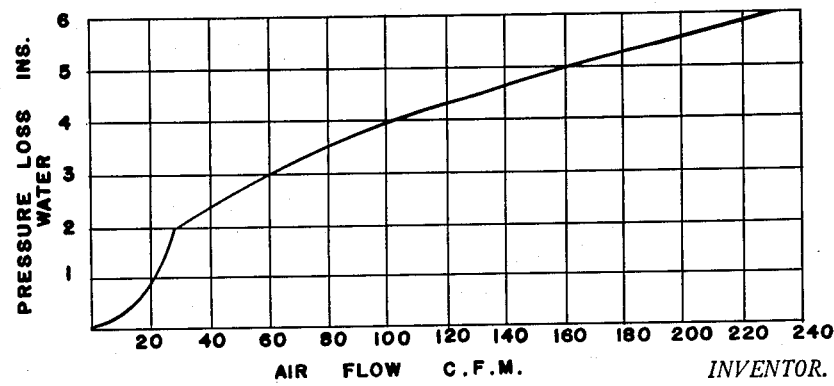
Fig. 6 is a chart showing the pressure loss in comparison to the air flow.

The above arrangement removes the majority of the dust before it reaches the filter for removing fine particles and thus extends the life of the filter many-fold while obtaining high overall efficiency. The relations between efficiency and air flow, and pressure drop and air flow are shown in Figures 5 and 6. These figures show that a high efficiency is reached at a relatively low air flow, about 30 C. F. M., and this high efficiency is maintained over a wide range of air flow without the rapid increase in pressure loss that would result from the use of a single centrifugal element. The rate of increase of pressure loss when a single element is used is shown by the first portion of the curve in Fig. 6. The marked change in slope of the curve in Fig. 6 that occurs at 30 C. F. M. is a result of the use of multiple centrifugal cleaners in place of a single unit.

The apparatus of the present invention was designed primarily to remove dirt from the air supplied to the engine of a motor vehicle, where the amount of air used by the engine will vary greatly as the speed of the engine changes. In the present device the inlet port 11 and outlet port 12 should be large enough to pass freely through the device the maximum volume of air the engine may need. An appreciable pressure drop between the inlet and outlet just mentioned will necessarily occur due to the retarding action of the fibrous filter 36.

In order to remove the coarse dirt from the air stream before it reaches the filter 36, a number of round centrifugal separators are provided each having a much smaller capacity for passing air therethrough than that of the inlet opening 11 and outlet opening 12. These separators are relatively small in diameter so that the air passing therethrough will be forced to rotate at high speed and thereby remove the coarse dust particles by centrifugal force. As soon as the volume of air which the engine is attempting to suck through the first separator 18a becomes abnormally great, one or more additional separators will be cut in as needed to supply more air to the engine. As a result of this construction, the work of centrifugally removing dirt from the air is handled by one separator when the volume of air required by the engine is small, and by more than one separator when the required volume of air increases. Therefore, in this construction the dirt removing action of each separator is far more uniform than would be the case if one centrifugal separator handled all of the air needed by the engine at its various speeds. As the fibrous filter 36 begins to clog, the difference in pressure between 11 and 12 will increase; but this will not change appreciably the above described operation of the centrifugal separators, unless the filter becomes so clogged that it should be changed.

I claim:

Apparatus for effectively cleaning air passing therethrough at widely different flow rates, comprising a cylindrical casing having at its upper end a central inlet passage and containing several round centrifugal separators disposed in an upright position concentrically about the central axis of the inlet, said casing having inlet and outlet plenum chambers and each separator having an inlet communicating with the inlet chamber and an outlet conduit communicating with the outlet chamber, an annular filter element surrounding said separators and communicating with said outlet chamber so that the air that enters said inlet passes through one or more separators and then through the filter element, each separator except the first one having an automatic valve in its outlet conduit that will open as the pressure in its separator reaches a predetermined value, and said valves being differently loaded to cause the separators to cut in and out of action in a predetermined order as the pressure varies, and thereby control the volume of air that passes through each separator.

References Cited in the file of this patent
UNITED STATES PATENTS

| | | |
|---|---|---|
| 451,139 | Smith | Apr. 28, 1891 |
| 883,413 | Mahoney | Mar. 31, 1908 |
| 1,405,399 | Donaldson | Feb. 7, 1922 |
| 1,423,412 | Garner | July 18, 1922 |
| 1,678,654 | Siefken | July 31, 1928 |
| 2,069,483 | Skajaa | Feb. 2, 1937 |
| 2,119,478 | Whiton | May 31, 1938 |
| 2,134,978 | Marshall | Nov. 1, 1938 |
| 2,209,339 | Knight | July 30, 1940 |
| 2,580,648 | Blair et al. | Jan. 1, 1952 |